US006506899B1

(12) United States Patent
Simms

(10) Patent No.: US 6,506,899 B1
(45) Date of Patent: Jan. 14, 2003

(54) PIGMENT DISPERSANTS FORMED BY REACTING AN ISOCYANATE WITH A POLY (ETHYLENE GLYCOL) ALKYL ETHER, A POLYESTER OR POLYESTER OR POLYACRYLATE AND A DIAMINE

(75) Inventor: John A. Simms, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/370,416

(22) Filed: Aug. 9, 1999

(51) Int. Cl.$^7$ .................. C07D 251/34; C07C 275/62; C07C 271/06; C07C 275/00; B01F 17/42
(52) U.S. Cl. .................. 544/222; 516/203; 528/49; 528/53; 560/25; 560/26; 560/115; 560/158; 564/38
(58) Field of Search .................. 516/203; 528/49, 528/53; 544/222; 560/25, 26, 115, 158; 564/38

(56) References Cited

U.S. PATENT DOCUMENTS

| | | | |
|---|---|---|---|
| 3,741,941 A | 6/1973 | Ashe | 528/354 |
| 3,775,327 A | 11/1973 | Thompson | 252/62.54 |
| 3,788,996 A | 1/1974 | Thompson | 252/62.54 |
| 3,817,944 A | 6/1974 | Jones | 528/354 |
| 4,029,861 A | 6/1977 | Jones | 526/14 |
| 4,032,698 A | 6/1977 | Ashe | 526/14 |
| 4,048,207 A | 9/1977 | Jones | 556/420 |
| 4,070,388 A | 1/1978 | Jones | 558/240 |
| 4,631,330 A | * 12/1986 | Dietz et al. | 528/49 |
| 4,647,647 A | 3/1987 | Haubennestel et al. | 528/83 |
| 4,762,752 A | 8/1988 | Haubennestel et al. | 428/407 |
| 4,795,796 A | 1/1989 | Haubennestel et al. | 528/28 |
| 5,399,294 A | 3/1995 | Quednau | 252/357 |
| 5,415,893 A | 5/1995 | Wiersma et al. | 427/385.5 |
| 5,425,900 A | 6/1995 | Quednau | 252/356 |
| 5,494,511 A | 2/1996 | Holbrook | 106/401 |
| 5,603,865 A | 2/1997 | DePue et al. | 252/313.1 |
| 5,631,341 A | 5/1997 | Morishima et al. | 528/60 |
| 5,700,867 A | 12/1997 | Ishiyama et al. | 524/539 |
| 5,708,086 A | 1/1998 | DePue et al. | 525/123 |

FOREIGN PATENT DOCUMENTS

| | | |
|---|---|---|
| JP | 56143280 | 11/1981 |
| JP | 05301935 | 11/1993 |

* cited by examiner

Primary Examiner—Rabon Sergent
(74) Attorney, Agent, or Firm—Steven C. Benjamin

(57) ABSTRACT

Pigment dispersants prepared by reacting an isocyanate oligomer having an average functionality of at least three with a polyester or polyacrylate, a poly(ethylene glycol) alkyl ether, and a diamine having a primary amine and a tertiary amine have excellent stabilizing properties and offer a wide formulation latitude with a variety of solvent systems, including polar solvents and water, and are particularly useful as pigment dispersants for paints and coating applications.

14 Claims, No Drawings

PIGMENT DISPERSANTS FORMED BY REACTING AN ISOCYANATE WITH A POLY (ETHYLENE GLYCOL) ALKYL ETHER, A POLYESTER OR POLYESTER OR POLYACRYLATE AND A DIAMINE

BACKGROUND OF THE INVENTION

This invention relates to polymeric pigment dispersants prepared by reacting an isocyanate with a hydrophilic poly (ethylene glycol)alkyl ether, a hydrophobic polyester or polyacrylate, and a diamine.

The materials described in this application are cationic dispersants. The cationic substitution allows their use with anionic pigments, particularly carbon black and surface treated organic pigments. In addition, the use of mixed arms provides broader solubility characteristics and utility with a wider range of coatings vehicles. These materials can therefore be considered "universal dispersants".

There are currently several trends in the coatings industry which dictate the need to use cationic dispersants, and are therefore relevant to this invention. First, the use of isocyanate crosslinked coatings is becoming more important because, in part, they generally do not have a cure inhibition problem with cationic dispersants. Also, partially condensed melamine resins show increasing importance as used in coatings, because they are generally not so strongly inhibited by cationic dispersants. Yet another trend is that pigment suppliers are providing more pigments, particularly phthalocyanines, which have anionic surface treatments (i.e.; the pigment is acidic) which made cationic dispersants the ideal choice to achieve strong pigment-to-dispersant interaction.

The lack of emphasis in prior work on cationic functional dispersants, particularly those comprising tertiary amines, was at least partly caused by the use of dispersants in industrial and automotive coatings, which were formulated to depend on acid catalysis of melamine resins for crosslinking. Amine functional dispersants usually cause some cure inhibition in such coatings. The urea functionality incorporated using ammonia was sufficiently adsorbed on many pigments and did not interfere with the cure mechanism.

The present invention differs from prior art dispersants in that it encompasses a unique combination of hydrophobic arm(s), hydrophilic arm(s) and amine arm(s) functionality on an urethane backbone.

SUMMARY OF THE INVENTION

The present invention provides a pigment dispersant comprising a urethane polymer having at least three urethane groups, wherein
(a) a hydrophilic poly(ethylene glycol)alkyl ether;
(b) a hydrophobic polymer selected from the group consisting of polyesters and polyacrylates; and
(c) a diamine comprising a primary amine group and a tertiary amine group.

The isocyanate oligomer may be chosen from isocyanurates or biurets of toluene diisocyanate("TDI"), hexamethylene diisocyanate ("HDI"), and mixtures thereof.

DETAILED DESCRIPTION OF THE INVENTION

The dispersants described herein are the reaction product of a multifunctional isocyanate with a polyester or polyacrylate, a polyethylene ether and a diamine. The polyester or polyacrylate and polyethylene ether "arms" have widely different solubility profiles and provide entropic stabilization for the dispersant in a wide range of solvent systems. The amine "arm" provides a functional group that can strongly interact with an acidic pigment for dispersion stability. Most preferably, the dispersants of this invention comprise the reaction product described above wherein 10 to 50 mole % of the isocyanate groups on the oligomer are reacted with a polyester or polyacrylate, 3 to 30 mole % are reacted with the poly(ethylene glycol) methyl ether and 30 to 65 mole % of the isocyanate groups are reacted with the diamine, with the proviso that 100% of the isocyanate groups are reacted.

Isocyanurates that may be used in this invention to provide the isocyanate oligomer are obtained from toluene diisocyanate ("TDI"; Desmodur IL), hexamethylene diisocyanate ("HDI"; Desmodur 3300); mixtures of TDI and HDI (Desmodur HL). A biuret that may be used is that obtained from hexamethylene diisocyanate (Desmodur N). These may be obtained from sources indicated in the Examples.

The isocyanate oligomers must have an average functionality of three or more, meaning that a molecule of the isocyanate contains, on statistical average, at least three free isocyanate groups. The average functionality, as opposed to the absolute number of isocyanate groups, is used because the isocyanates are obtained as isomeric mixtures of isocyanates having 3, 4, 5 or more functional groups. The average functionality can be determined experimentally by titrating to determine the weight % of isocyanate, determining the number average molecular weight ("Mn") of the oligomer (such as by Gel Permeation Chromatography "GPC"), and then calculating the average number of isocyanate groups.

The dispersants of this invention are prepared by sequentially reacting the polyester or polyacrylate, the poly (ethylene glycol), and the diamine with the selected isocyanate oligomer. At the conclusion of the synthesis, all of the isocyanate groups have been reacted.

The polyesters suitable for use in the invention have the general formula:

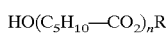

where R is an alkyl of 1 to 12 carbons and n is an integer of 6 to 10. These polyesters are conveniently prepared by reacting caprolactone with an alcohol. The length of the polyester arm for any particular dispersion is determined by a balance between its being long enough to give good pigment dispersion and yet not so long that it crystallizes too readily to produce a unstable solution. A typical synthesis of the polyester arm using n-decanol and caprolactone, is shown in the following figure:

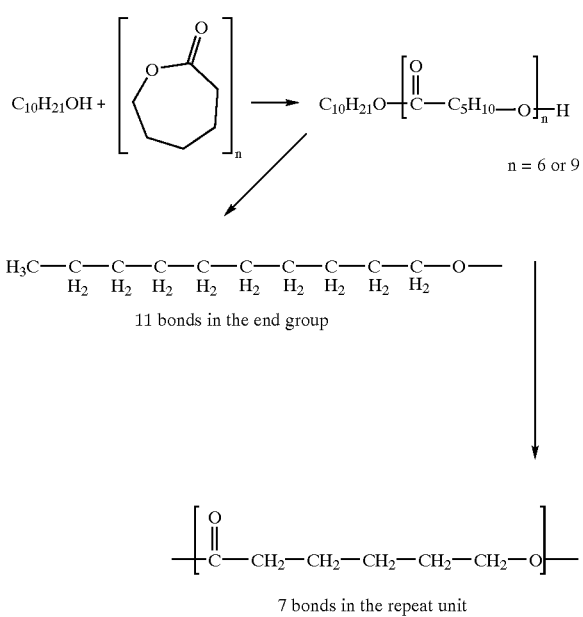

The length of the arm containing six repeat units (i.e., n=6) is calculated at 6.63 nm and the length of the arm containing nine repeat units (n=9) is 9.25 nm.

Polyacrylates useful in the present invention are hydroxy-terminated (meth)acrylic polymers. Such polymers are prepared by reacting (meth)acrylic monomers with 2-mercaptoethanol in the presence of a free radical initiator. Azo initiators such as azobisisobutyronirile (VAZO® 64, E. I du Pont de Nemours & Co., Wilmington, Del.) are particularly useful. Other useful monomer compositions and initiating conditions are described in U.S. Pat. No. 4,032, 698, the disclosure of which incorporated herein in its entirety. The preparation of the polyacrylate arm is illustrated schematically by the following equations:

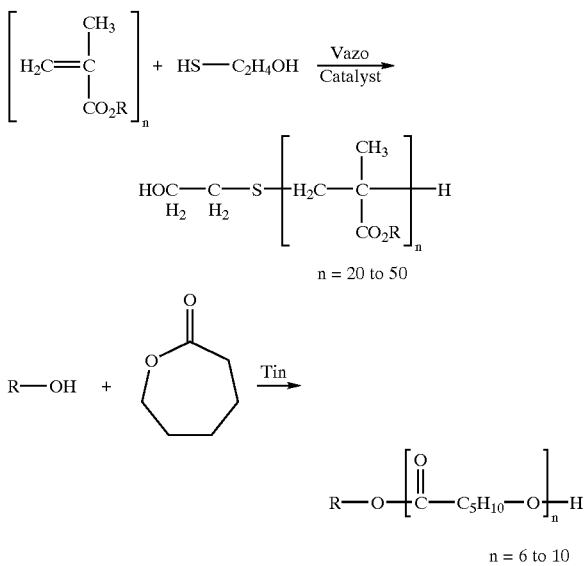

Poly(ethylene glycol)alkyl ether polymers useful in this invention are those having the general formula $$H(O-CH_2-CH_2)_n-OR$$

where n is an integer of 15 to 67 and R is an alkyl of 1 to 4 carbons, preferably methyl. The poly(ethylene glycol) alkyl ethers have a number average molecular weight ("Mn") between 750 and 3000, preferably between 900 and 2500, and all ranges encompassed therein. The poly (ethylene glycol)alkyl ethers have a single hydroxyl functional group. Such polymers are commercially available from Aldrich Chemical and other sources. Alternatively, poly(ethylene glycol)alkyl ether polymers can easily be prepared using conventional techniques well known to those skilled in the art.

Suitable diamines useful in the invention are those having a primary amine and a tertiary amine. Such diamines have the general formula:

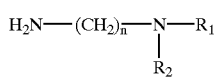

where n is an integer of 2 to 5, preferably 3, $R_1$ and $R_2$ are each independently an alkyl of 1 to 4 carbons or together form a saturated or unsaturated 5 to 8 member ring optionally containing N or O. Three diamines which are preferred are:

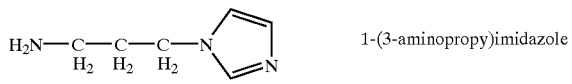   1-(3-aminopropy)imidazole

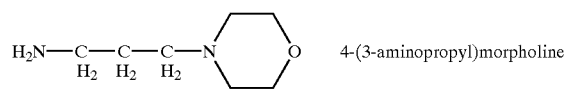   4-(3-aminopropyl)morpholine

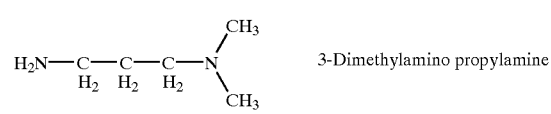   3-Dimethylamino propylamine 1-(3-aminopropyl)imidazole is the most preferred. It has the complexing activity of pyridine, but is more basic. It has a relatively low equivalent weight, and is commercially available. In the experimental results reported herein, it was necessary to use a 10 to 15% calculated excess of isocyanate to ensure complete consumption of all of the diamine used in the last step of the synthesis.

The dispersants of this invention can thus be schematically illustrated by the figure below, in which a tri-functional isocyanate has been reacted with a diamine, a polyester and a poly(ethylene glycol)methyl ether. It should be recognized that, in accordance with the invention, the polyester could be substituted with a polyacrylate in the figure below.

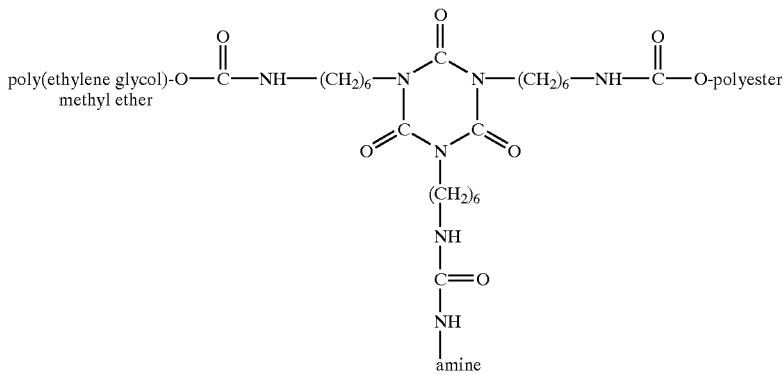

The dispersants of this invention are useful in making pigment dispersions and mill bases for paints and other coatings. To form a pigment dispersion or a mill base, pigments are added to the dispersant and the pigments are dispersed using conventional techniques such as high speed mixing, ball milling, sand grinding, attritor grinding or two or three roll milling. The resulting pigment dispersion has a pigment to dispersant binder weight ratio of 100/1 to 100/500.

Any of the conventional pigments used in paints can be used to form the pigment dispersion such as metallic oxides like titanium dioxide, iron oxides of various colors, zinc oxide, carbon black, filler pigments such as talc, china clay, barytes, carbonates, silicates and a wide variety of organic pigments such as quinacridones, phthalocyanines, perylenes, azo pigments, indanthrones, carbazoles such as carbazole violet, isoindolinones, thioindigo reds, benzimidazolinones, metallic flakes such as aluminum flake, pearlescent flakes and the like.

It may be desirable to add other optional ingredients to the pigment dispersion such as antioxidants, flow control agents, rheology control agents such as fumed silica, microgels, UV stabilizers, screeners, quenchers and absorbers. The pigment dispersions can be added to a variety of solvent borne or aqueous coating compositions such a primers, primer surfacers, topcoats which may be monocoats or basecoats of a clear coat/base coat finish. These compositions preferably have an acrylic polymer or polyester polymer or a blend of these types of coating vehicle as the film forming constituent and may also contain crosslinking agents such as blocked isocyanates, isocyanates, alkylated melamines, epoxy resins and the like. Other film forming polymers can also be used, such as acrylourethanes, polyester urethanes, polyethers and polyether urethanes that are compatible with the pigment dispersion.

The following examples illustrate the invention. All parts and percentages are on a weight basis unless otherwise indicated. Molecular weights are determined by gel permeation chromatography using polystyrene as the standard and tetrahydrofuran as the carrier solvent.

EXAMPLES

Unless otherwise specified, all chemicals and reagents were used as received from Aldrich/Sigma Chemical Company, Milwaukee, Wis.

| | |
|---|---|
| 1-(3-aminopropyl)imidazole | BASF, Ludwigshafen, Germany |
| 4-(3-aminopropyl)morpholine | Huntsman Corp., Austin, TX |
| 3-dimethylamino propylamine | Huntsman Corp., Austin, TX |

Test Methods

Knoop Hardness Number (KHN)

The KHN values were the result of an indentor hardness measurement as described in ASTM D1474.

Gardner-Holdt Viscosity (GH)

The GH viscosity were determined using a comparative set of viscosity standards to obtain a bubble tube match. The method is described in ASTM D 1545-76.

Molecular Weight by Size Exclusion Chromatography

The standards used were 0.1% of polystyrene of 3.04M, 1.03M, 330K, 156K, 66K, 28.5K, 9.2K, 3.25K, 580 molecular weight. A point to point calibration was used with these narrow molecular weight standards. Tetrahydrofuran was used as the solvent. A Waters 410 RI detector (Milford, Mass.) was used for the measurements. The columns used were from Polymer Laboratories, Inc. (Amherst, Mass.) (part #1110-6500). The column heater temperature was 30° C. The detector temperature was 35° C. The flow rate was 1.0 ml/min. with an injection volume of 100 $\mu$l of the 0.1% solution of experimental polymer in THF. The samples were filtered through a 0.5 $\mu$m Millipore filter before being run.

Amine Number Determination

A 2 g sample was diluted with 25 ml of THF. Ten drops of 0.1% bromophenol blue indicator was then added and the solution titrated to a blue to yellow end point with 0.1 N aqueous hydrochloric acid.

Amine #=cc Titrant×Normality×56.1/sample wt.

Example 1

Polyester of 6:1 Mole Ratio of Caprolactone to n-decanol

The following materials were combined in a 2 liter flask fitted with a stirrer thermocouple and condenser. The condenser was topped with a nitrogen inlet to maintain a constant pressure of nitrogen in the flask.

| Component | Weight, grams |
| --- | --- |
| n-decyl alcohol | 253.2 |
| 10% dibutyl tin dilaurate in caprolactone | 2.4 |
| Caprolactone | 1094.0 |

The materials were heated with stirring to 140° C. over about 25 minutes and held at 140 to 147° C. for three hours. The product formed was a white wax which remelted to a clear liquid when heated at 60° C., and was 99.28% solids, with a calculated OH#=66.5 (for a 6/1 mole ratio of caprolactone to n-decanol), and a calculated Mn=843.2.

Example 2

Polyester of 9:1 Mole Ratio of Caprolactone to n-decanol

Example 1 was repeated using 9 moles of caprolactone for every 1 mole of n-decanol. The resulting product was 99.7% solids, had a calculated OH# of 47 and a calculated molecular weight of 1186.

Example 3

Polyester of 10:1 Mole Ratio of Caprolactone to n-decanol

Example 1 was repeated using 10 moles of caprolactone for every 1 mole of n-decanol. The resulting product was 99.6% solids, had a calculated OH# of 43 and a calculated molecular weight of 1300.

Example 4

Monohydroxy poly(methyl methacrylate)

A monohydroxy acrylic arm can be prepared by the following solution feed process:
Charge:

| Part | Component | Weight, g. | Function |
| --- | --- | --- | --- |
| I | ethyl acetate | 360.5 | Solvent |
| II | azobis isobutyronitrile | 1.64 | Initiator |
|  | 2-mercaptoethanol | 14.06 | OH source |
|  | ethyl acetate | 50.0 | Solvent |
| III | methyl methacrylate | 600.0 | Monomer |

Charge part I to a 2 liter reactor fitted for reflux and two feed streams. Bring the ethyl acetate to reflux under a nitrogen blanket and concurrently feed part II over 200 minutes and part III over 185 minutes while maintaining reflux. Continue heating at reflux for an additional 30 minutes. Complete conversion of the reactants will occur to produce a clear solution with a 60% nonvolatile content. The calculated OH number of the solids is 16.4. The estimated end to end length of the product is 8 nanometers. The calculated molecular weight is 3421.

Example 5

Monohydroxy poly(n-butyl methacrylate)

A monohydroxy acrylic arm with lower viscosity and improved solubility in low polarity solvents can be prepared by the following solution feed process:
Charge:

| Part | Component | Weight, g. | Function |
| --- | --- | --- | --- |
| I | ethyl acetate | 529.3 | Solvent |
| II | azobis isobutyronitrile | 1.64 | Initiator |
|  | 2-mercaptoethanol | 14.06 | OH source |
|  | ethyl acetate | 50.0 | Solvent |
| III | n-butyl methacrylate | 853.2 | Monomer |

Charge part I to a 2 liter reactor fitted for reflux and two feed streams. Bring the ethyl acetate to reflux under a nitrogen blanket and concurrently feed part II over 200 minutes and part III over 185 minutes while maintaining reflux. Continue heating at reflux for an additional 30 minutes. Complete conversion of the reactants will occur to produce a clear solution with a 60% nonvolatile content. The calculated OH number of the solids is 11.62. The estimated end to end length of the product is 8 nanometers. The calculated molecular weight is 4828.

The materials for the preparation of the acrylic arms can be obtained from Aldrich Chemical Co.

Comparative Example A

As a comparison, a dispersant was prepared by reacting an isocyanate with a polyester and a diamine. The comparative dispersant did not contain a poly(ethylene glycol)alkyl ether arm. The following reaction was done at sub-reflux in a nitrogen blanketed reactor. A 1 liter flask was fitted for portionwise addition of the amine solution. The following charge was used:

| Part | Component | Wt., grams |
| --- | --- | --- |
| I | polyester from Example 1 | 105.98 |
|  | Methoxypropyleneglycol acetate, <0.05% water | 300.00 |
|  | Desmodur IL | 155.52 |
| II | 1-(3-aminopropyl)imidazole | 16.26 |
|  | Methoxypropyleneglycol acetate, <0.05% water | 88.91 |
| III | 1-(3-aminopropyl)imidazole | 0.80 |

There was an excess of about 14% isocyanate used. Part of this was used in a final hit of 1-(3-aminopropyl)imidazole (Part III) to give a theoretical excess of 11.3% of isocyanate. The ultimate fate of the balance of the isocyanate is unknown, but based on the absence of IR peaks specific to isocyanate, reactive isocyanate groups are not in the product.

Part I was charged to the flask and heated under nitrogen for 2 hours at 70° C. Parts II and III were then added according to the following log:

| Time, min. | Temperature, ° C. | Comments |
| --- | --- | --- |
| 0 | 61 | 73.6 g of II added (70%) |
| 10 | 57 | Addition complete, heat on |
| 25 | 60 | IR shows isocyanate |
| 40 | 58 | 10.52 g of II added (10%) |
| 55 | 55 | IR shows isocyanate |
| 65 | 55 | 10.52 g of II added (10%) |
| 80 | 56 | IR shows isocyanate |
| 90 | 55 | 10.52 g of II added (10%) |
| 105 | 56 | IR shows isocyanate |

-continued

| Time, min. | Temperature, °C. | Comments |
|---|---|---|
| 145 | 56 | Part III added, = 5% excess |
| 160 | 56 | No isocyanate, rxn complete |

The product solution had the following characteristics:

| Test | Result |
|---|---|
| % Solids (wt) | 30.46 |
| GH Viscosity (Stokes) | C-¼ (0.80) |
| Amine Number solution (solids) | 11.3 (37.01) |
| Theoretical amine number, on solids | 38.2 |
| KHN of film | 1.65 |

Example 6

A dispersant in accordance with the invention was prepared by reacting an isocyanate with a the polyester from Example 2, a poly(ethylene glycol)methyl ether (Mn= 2000,), and a diamine. The dispersant was at least as good as that of Comparative Example A, but the presence of the poly(ethylene glycol)methyl ether arm makes the dispersant more compatible with polar solvents and water.

| Reactant | Active group | MW | Conc., Meq/gm |
|---|---|---|---|
| polyester from Example 2 | OH | 1183.0 | 0.845 |
| poly(ethylene glycol)methyl ether | OH | 2000 | 0.500 |
| 1(3-aminopropyl)imidazole | NH$_2$ | 125.18 | 7.99 |
| Desmodur IL (Bayer Corp.) | NCO | 787 | 3.81 |

This reaction was also done at sub-reflux in a nitrogen blanketed reactor. The 1 liter flask was fitted with a dropping funnel for portion wise addition of the amine solution. The following charge was used:

| Part | Component | Weight, grams |
|---|---|---|
| I | polyester from Example 2 | 102.05 |
|  | Methoxypropyleneglycol acetate, <0.05% water | 300.00 |
|  | Poly(ethylene glycol)methyl ether, Mn = 2000 | 14.65 |
|  | Desmodur IL | 135.05 |
| II | 1-(3-aminopropyl)imidazole | 15.77 |
|  | Methoxypropyleneglycol acetate, <0.05% water | 99.14 |

Part I was charged to the flask and headed under nitrogen for 2.5 hours at 70° C. Part II was then added according to the following log. In this experiment, even though the calculation showed that 14.6% excess isocyanate was being used, all of the isccyanate was used up by the charge so that no additional amine was needed (i.e., no Part III was needed as in Comp. Ex. A above).

| Time, min. | Temperature, °C. | Comments |
|---|---|---|
| 0 | 74 | 57.46 g of Ex. 2 added (50%) |
| 10 | 72 | Addition complete |
| 25 | 60 | IR showed isocyanate |
| 35 | 59 | 28/73 g of Ex. 2 added (25%) |
| 45 | 56 | Addition complete |
| 60 | 50 | IR showed small isocyanate peak |
| 70 | 47 | 28.73 g of Ex. 2 added (25%) |
| 80 | 45 | Addition complete |
| 95 | 41 | No isocyanate, reaction complete |

The product solution had the following characteristics:

| Test | Result |
|---|---|
| % Solids | 30.16 |
| GH Viscosity (Stokes) | H-¼ (1.92) |
| Amine Number solution (solids) | 10.94 (37.27) |
| Theoretical amine # | 35.34 |
| KHN of film | 0.80 |

The lower percent of Desmodur IL, the hard component in the reaction (33.76% versus 36.48%) is thought to account for the lower hardness. This is the result of the use of the longer arms in this product.

Example 7

Example 6 was repeated, except that 4-(3aminopropyl) morpholine was used as the diamine.

Example 8

Example 6 was repeated except that Desmodur HL was used as the isocyanurate.

Example 9

Example 8 was repeated except that 3-aminomethyl pyridine was used as the diamine.

Example 10

Example 8 was repeated except that 3-dimethylamino propylamine was used as the diamine.

Bottle grinds with 40 parts of dispersant to 100 parts of pigment (except carbon black where 125 parts dispersant was used). The dispersions were allowed to settle overnight and the dispersed material examined at 200–400× for extent of flocculation. The results are found in the table below, with the values as shown in the key:

TABLE 2

| Pigment Name and Source | Dispersant Activity ||||||
|---|---|---|---|---|---|---|
|  | Comp. Ex. A | Ex. 4 | Ex. 5 | Ex. 6 | Ex. 7 | Ex. 8 |
| Blue 15:2, Ciba; (CAS# 855-12-3) | 0 | 0 | 0 | 0 | 0 | 0 |
| Blue 15:2, Ciba; (CAS# 436-78-6) | 0 | 0 | 1 | 0 | 0 | 0 |
| Red 101, BASF | 0 | 0 | 3 | 0 | 0 | 0 |
| Black 7, Columbia | 0.5 | 1 | 3 | 0 | 0 | 0 |
| Red DPP, Ciba | 1.5 | 0 | 0.5 | 3 | 3 | 3 |

TABLE 2-continued

Dispersant Activity

| Pigment Name and Source | Dispersant | | | | | |
|---|---|---|---|---|---|---|
| | Comp. Ex. A | Ex. 4 | Ex. 5 | Ex. 6 | Ex. 7 | Ex. 8 |
| Quinacridone, Ciba | 0 | 0 | 0 | 0 | 0 | 0 |
| Blue 15:4, Clariant | 0 | 0 | 0 | 0 | 0 | 0 |
| Green 7, Sun Chemical | 0 | 0 | 0 | 0 | 0 | 0 |
| Red 179 | 0 | 0 | 0 | 0 | 0 | 0 |
| Rutile TiO$_2$, DuPont | 0 | 0 | 0 | 0 | 0 | 0 |
| Violet 19, Ciba; (CAS# 51-03-0) | 3 | 2 | 0.5 | 0 | 0 | 2.5 |
| Violet 19, Ciba; (CAS# 784-63-8) | 0 | 0.5 | 2.5 | 0 | 0 | 0 |
| Yellow 154, Clariant | 0.5 | 1.5 | 0 | 0 | 0 | 3 |
| Yellow Fe$_2$O$_3$, Bayer | 0 | 0 | 0 | | | |
| Yellow 184, Ciba | 0 | 0 | 0.5 | 0 | 0 | 0 |

Key
0 deflocculated, Brownian motion
1 slightly flocculated
2 moderately flocculated
3 severely flocculated

| Pigment Manufacturers: | |
|---|---|
| Ciba | Ciba Specialty Chemicals Pigments Division, Newport, DE |
| BASF | BASF Corp., Charlotte, NC |
| Columbian | Columbian Chemicals Co., Marietta, GA |
| Clariant | Clariant Corp., Charlotte, NC |
| Sun Chemical | Sun Chemical Corp., Cincinnati, OH |
| Bayer | Bayer Corp., Pittsburgh, PA |

Example 11

Example 6 was repeated to prepare a dispersant having a higher content of poly(ethylene glycol)methyl ether. Assuming an average isocyanate functionality of 6, the dispersant will contain, on average, 0.5 moles of the hydrophobic polyester arms, 0.9 moles of the hydrophilic poly(ethylene glycol)methyl ether arms and 2.2 moles of the imidazole groups.

| Reactant | Conc., Meq/gm | Weight | MEQ of Functional Group | Mole % of isocyanate consumed |
|---|---|---|---|---|
| polyester from Ex. 2 | 0.845 | 15.99 | 13.51 | 13.91% |
| poly(ethylene glycol)methyl ether, Mn 2,000 | 0.50 | 48.35 | 24.18 | 24.89% |
| 1(3-aminopropyl)imidazole | 7.99 | 7.44 | 59.45 | 61.20% |
| Desmodur IL | 3.81 | 28.22 | 107.52 | |

This reaction was done at sub reflux in a nitrogen blanketed reactor. The 1 liter flask was fitted with a dropping funnel for portion wise addition of the amine solution. The following charge was used:

| Part | Component | Wt., gm | % of Solids |
|---|---|---|---|
| I | polyester from Ex. 2 | 47.97 | 16.00 |
| | Poly(ethylene glycol)methyl ether | 145.06 | 48.40 |
| | Mn 2000 | | |
| | Desmodur IL | 169.31 | 28.20 |
| II | 1-(3-aminopropyl) imidazole, BASF | 22.31 | 7.4 |
| III | isopropyl alcohol | 215.35 | |
| IV | Tetrahydrofuran | 75 | |
| V | water | 100 | |
| VI | water | 100 | |

Part I was charged to the flask and headed under nitrogen for 3 hours at 70° C. Although it became fairly viscous, it was still easy to stir. IR indicated an appropriate drop in isocyanate had occurred. Part II was then added over about 3 minutes at about 70° C. The temperature rose to 75° C., and the mixture became very viscous. Part III was added, then part IV without preventing the material from becoming gel like. Only when part V was added did the mixture begin to thin and go into solution. It was held for 96 hours at 25° C. with occasional stirring as it dissolved. Finally part VI was added to thin the clear light yellow solution for filtration through a stainless steel mesh paint filter.

The product solution had the following characteristics:

| Test | Result |
|---|---|
| % Solids | 34.8 |
| Theoretical solids | 34.3 |
| GH Viscosity (Stokes) | K-½ (2.6) |
| Theoretical amine #, on solids | 33.3 |

This clear solution became colloidal when diluted to 10% with water. The diluted material was hazy and not entirely free of large particles.

Example 12

Dispersant with Methyl Methacrylate and Methoxy PEO 2000 Arms

This dispersant can be prepared using the following charge. A theoretical excess of 10% Desmodur IL is included.

| Part | Component | Weight, grams |
|---|---|---|
| I | Poly(methyl methacrylate) with OH from first acrylic example, above | 570 |
| | Methoxypropyleneglycol acetate, <0.05% water | 900 |
| | Poly(ethylene glycol)methyl ether, Mn-2000 | 200 |
| | Desmodur IL | 174 |
| II | 1-(3-aminopropyl)imidazole | 12.5 |
| | Methoxypropyleneglycol acetate, <0.05% water | 100 |

Charge part I to the reactor and heat under nitrogen for 2.5 hours at 70° C. Then charge part II. Heat at 60° C. for 1.5 hours to complete the reaction. The product will have a non-volatile content of 33%. The amine number on solids will be about 8.74.

This material will be a good dispersant for acidic pigments and would be particularly suitable for use in acrylic lacquers.

What is claimed is:

1. A pigment dispersant consisting of a reaction product resulting from reacting an isocyanate oligomer having on a statistical average at least three isocyanate groups with:
   (a) a hydrophilic poly(ethylene glycol)alkyl ether;
   (b) a hydrophobic polymer selected from the group consisting of polyesters and polyacrylates; and
   (c) a diamine comprising a primary amine group and a tertiary amine group;
wherein the isocyanate oligomer, the hydrophilic poly(ethylene glycol)alkyl ether of (a), and the hydrophobic polymer of (b) are reacted prior to being reacted with the diamine of (c);
wherein the polyester of (b) has the general formula

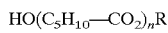
$$HO(C_5H_{10}-CO_2)_nR$$

where R is an alkyl of 1 to 12 carbons and n is an integer of 6 to 10.

2. The dispersant of claim 1, wherein the polyester is prepared by reacting caprolactone and n-decanol in a mole ratio of 6:1.

3. The dispersant of claim 1 wherein the polyester is prepared by reacting caprolactone and n-decanol in a mole ratio of 9:1.

4. The dispersant of claim 1 wherein the polyester is prepared by reacting caprolactone and n-decanol in a mole ratio of 10:1.

5. The dispersant of claim 1, wherein the poly(ethylene glycol)alkyl ether has the general formula

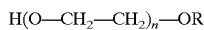
$$H(O-CH_2-CH_2)_n-OR$$

where n is an integer between 15 to 67 and R is an alkyl of 1 to 4 carbons and has a number average molecular weight ("Mn") between 750 and 3000.

6. The dispersant of claim 5 wherein R is methyl and wherein the poly(ethyleneglycol)alkyl ether has a molecular weight between 900 and 2500.

7. The dispersant of claim 1, wherein the diamine has the general formula

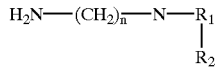
$$H_2N-(CH_2)_{\overline{n}}-N-\begin{matrix}R_1\\|\\R_2\end{matrix}$$

Where n is an integer of 2 to 5, and $R_1$ and $R_2$ are each independently an alkyl of 1 to 4 carbons or together form a saturated or unsaturated 5 to 8 member ring optionally containing N or O.

8. The dispersant of claim 1 wherein 10 to 50 mole % of the isocyanate groups on the oligomer are reacted with the hydrophobic polymer, 3 to 30 mole % are reacted with the poly(ethylene glycol)alkyl ether and 30 to 65 mole % of the isocyanate groups are reacted with the diamine, with the proviso that 100% of the isocyanate groups are reacted.

9. A pigment dispersant consisting of a reaction product resulting from sequentially reacting an isocyanate oligomer having on a statistical average at least three isocyanate groups with, in the following order:
   (a) a hydrophobic polymer selected from the group consisting of polyesters and polyacrylates; and then
   (b) a hydrophilic poly(ethylene gycol)alkyl ether; and finally
   (c) a diamine comprising a primary amine group and a tertiary amine group;
wherein the polyester of (a) has the general formula

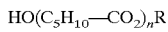
$$HO(C_5H_{10}-CO_2)_nR$$

where R is an alkyl of 1 to 12 carbons and n is an integer of 6 to 10.

10. A pigment dispersant consisting of a reaction product resulting from sequentially reacting an isocyanate oligomer having on a statistical average at least three isocyanate groups with, in the following order:
   (a) a hydrophobic polymer selected from the group consisting of polyesters and polyacrylates and a hydrophilic poly(ethylene glycol)alkyl ether; and then
   (b) a diamine comprising a primary amine group and a tertiary amine group;
wherein the polyester of (a) has the general formula

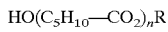
$$HO(C_5H_{10}-CO_2)_nR$$

where R is an alkyl of 1 to 12 carbons and n is an integer of 6 to 10.

11. The pigment dispersant of claim 1, 9 or 10 wherein said isocyanate oligomer is a isocyanurate or biuret.

12. The pigment dispersant of claim 11 wherein said isocyanurate is selected from the group consisting of isocyanurate of toluene diisocyanate, isocyanurate of hexamethylene diisocyanate, and mixtures thereof.

13. The pigment dispersant of claim 11 wherein said biuret is hexamethylene diisocyanate biuret.

14. A pigment dispersant consisting essentially of a reaction product resulting from reacting an isocyanate oligomer having on a statistical average at least three isocyanate groups with:
   (a) a hydrophilic poly(ethylene glycol)alkyl ether;
   (b) a hydrophobic polyacrylate; and
   (c) a diamine comprising a primary amine group and a tertiary amine group;
wherein the isocyanate oligomer, the hydrophilic poly(ethylene glycol)alkyl ether of (a), and the hydrophobic polyacrylate of (b) are reacted prior to being reacted with the diamine of (c).

* * * * *